United States Patent
Matsumura et al.

(10) Patent No.: US 9,912,176 B2
(45) Date of Patent: Mar. 6, 2018

(54) TEMPLATE BATTERY AND CIRCUIT DESIGN THEREOF

(71) Applicant: INTEL CORPORATION, Santa Clara, CA (US)

(72) Inventors: Naoki Matsumura, San Jose, CA (US); Andrew Keates, Los Gatos, CA (US); Arto Siili, Tampere (FI); Jeffrey M. Schline, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 14/958,877

(22) Filed: Dec. 3, 2015

(65) Prior Publication Data
US 2017/0163048 A1    Jun. 8, 2017

(51) Int. Cl.
| | |
|---|---|
| *H02J 7/00* | (2006.01) |
| *H01M 10/0525* | (2010.01) |
| *H01M 10/058* | (2010.01) |
| *H01M 10/44* | (2006.01) |
| *H01M 10/04* | (2006.01) |
| *H01M 10/052* | (2010.01) |
| *H01M 10/0585* | (2010.01) |
| *H01M 10/42* | (2006.01) |
| *H01M 10/46* | (2006.01) |

(52) U.S. Cl.
CPC ....... *H02J 7/0013* (2013.01); *H01M 10/0436* (2013.01); *H01M 10/052* (2013.01); *H01M 10/058* (2013.01); *H01M 10/0525* (2013.01); *H01M 10/0585* (2013.01); *H01M 10/425* (2013.01); *H01M 10/441* (2013.01); *H01M 10/46* (2013.01); *H02J 7/0026* (2013.01); *H01M 2010/4271* (2013.01); *H01M 2010/4278* (2013.01)

(58) Field of Classification Search
CPC ....................................................... H02J 7/0013
USPC ........................................................... 320/107
See application file for complete search history.

(56) References Cited

U.S. PATENT DOCUMENTS

| | | | |
|---|---|---|---|
| 5,631,538 A | 5/1997 | Komrska | |
| 6,224,995 B1 | 5/2001 | Fauteux et al. | |
| 2001/0032666 A1* | 10/2001 | Jenson | A61N 1/3787 136/256 |
| 2008/0281244 A1* | 11/2008 | Jacobs | A61B 5/0002 602/41 |

(Continued)

FOREIGN PATENT DOCUMENTS

| | | |
|---|---|---|
| WO | 2015-046803 | 4/2015 |
| WO | WO 2017/095530 | 6/2017 |

OTHER PUBLICATIONS

Flexion™ Thin Film Batteries_BrightVolt <http://www.brightvolt.com/products/flexion-batteries/> Downlowded Oct. 9, 2015, 3 pages.

(Continued)

*Primary Examiner* — Suchin Parihar
(74) *Attorney, Agent, or Firm* — Patent Capital Group

(57) ABSTRACT

A template battery comprises one or more layers that fill into a dead space on a substrate. The substrate comprises one or more components. The one or more layers of the template battery are arranged as a mirror image of the topography of the one or more components on the substrate. A template battery is coupled to a charge controller. The charge controller is coupled to the main battery.

19 Claims, 9 Drawing Sheets

(56) References Cited

U.S. PATENT DOCUMENTS

| | | | |
|---|---|---|---|
| 2009/0286152 A1* | 11/2009 | Nishino | H01M 2/0227 |
| | | | 429/178 |
| 2010/0330423 A1* | 12/2010 | Cui | H01M 4/38 |
| | | | 429/220 |
| 2012/0115020 A1 | 5/2012 | Hwang | |
| 2013/0157127 A1* | 6/2013 | Hirose | B60L 3/0046 |
| | | | 429/211 |
| 2014/0099525 A1 | 4/2014 | Kwon et al. | |
| 2014/0203783 A1* | 7/2014 | Kiesel | H01M 10/42 |
| | | | 320/134 |
| 2015/0248149 A1* | 9/2015 | Yamazaki | G06F 1/1635 |
| | | | 361/679.27 |
| 2016/0156012 A1* | 6/2016 | Takahashi | H01M 2/021 |
| | | | 429/163 |
| 2016/0218387 A1* | 7/2016 | Tajima | H01M 10/0431 |
| 2017/0110760 A1* | 4/2017 | Hatta | H01M 10/0565 |
| 2017/0162850 A1* | 6/2017 | Murakami | H01M 2/1686 |

OTHER PUBLICATIONS

International Search Report and the Written Opinion from International Application No. PCT/US2016/056428 dated Jan. 11, 2017, 13 pages.

Flexion™ Thin Film Batteries_BrightVolt <http://www.brightvolt.com/products/flexion-batteries/> Downloaded Oct. 9, 2015, 3 pages.

\* cited by examiner

TEMPLATE BATTERY AND CIRCUIT DESIGN THEREOF

FIELD

Embodiments described herein generally relate to a field of electronic devices, and in particular, but not exclusively, to energy storage devices.

BACKGROUND

Generally, a rechargeable battery refers to a type of electrical battery which can be charged, discharged into a load, and recharged many times. A non-rechargeable battery refers to a type of electrical battery that is supplied fully charged, and discarded once discharged. Rechargeable batteries are produced in many different shapes and sizes, ranging from button cells to megawatt systems connected to stabilize an electrical distribution network.

A lithium-ion (Li-ion) battery is a rechargeable battery in which lithium ions move from one electrode to another electrode. Typically, a Li-ion battery includes an electrolyte, which provides for ionic movement, and the positive and negative electrodes. A lithium-ion battery is commonly used as an energy storage device in consumer electronics, for example, as an energy storage device for mobile devices, e.g. tablets, smart phones and notebook personal computers (PCs).

Generally, energy density of the battery refers to the amount of energy stored per unit volume. As the sizes of mobile devices get smaller, the energy density of batteries is typically reduced due to the amount of packaging around the battery cells. Typically, the decrease in the energy density of the battery causes reduced battery run-time in mobile electronic devices, and such devices may need to be made larger to accommodate batteries large enough to achieve acceptable battery run-times.

BRIEF DESCRIPTION OF THE DRAWINGS

Embodiments of the invention may best be understood by referring to the following description and accompanying drawings that are used to illustrate embodiments of the invention. In the drawings.

DETAILED DESCRIPTION

Figure 1:
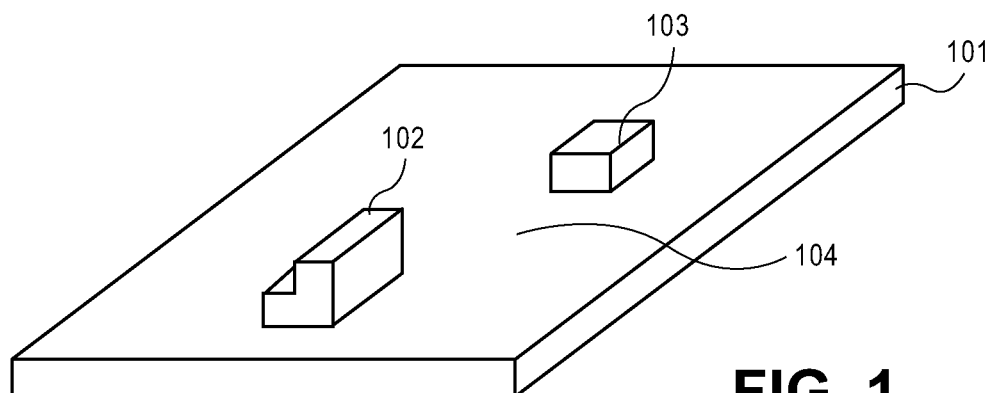
FIG. 1 is a perspective view showing a substrate according to one embodiment.

Methods and apparatuses to provide a template battery and a circuit design thereof are described. A template battery comprises one or more layers to fill in a dead space on a substrate. The substrate comprises one or more components. The one or more layers of the template battery are arranged as a mirror image of the topography of the one or more components on the substrate. In one embodiment, the template battery is advantageously filled in the dead space between the components on the printed circuit board inside a mobile device as an additional battery. By creating the mirror image of the topography of the one or more components on the substrate, the gaps between the components are advantageously filled with the battery layers that increases the energy density and prolongs a battery life without compromising the device performance and size.

Embodiments of the template battery described herein provide an advantage by extending the battery life comparing with conventional systems. In one embodiment, the battery life is extended by many percent. In another embodiment, the battery life is extended by a few percent. The extension of the battery life depends on the amount of dead space of the system. The greater the dead space filled by the template battery the greater the battery life extension.

In one embodiment, a system to provide a template battery comprises a power supply, a charge controller and a template battery coupled between the power supply and the charge controller. In one embodiment, the template battery is connected between the power supply (e.g., an AC adapter, or other DS power supply) and a charge controller integrated circuit (charger IC) and ground. The template battery is advantageously used to provide power to the system even if the template battery has a charge voltage that is different from that of a main battery, or even if the template battery has a self-discharge higher than that of the main battery, or both.

In the following description, various aspects of the illustrative implementations will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative implementations. However, it will be apparent to one skilled in the art that the embodiments of the present invention may be practiced without the specific details. In other instances, well-known features are omitted or simplified in order not to obscure the illustrative implementations.

Various operations will be described as multiple discrete operations, in turn, in a manner that is most helpful in understanding the embodiments of present invention, however, the order of description should not be construed to imply that these operations are necessarily order dependent. In particular, these operations need not be performed in the order of presentation.

While certain exemplary embodiments are described and shown in the accompanying drawings, it is to be understood that such embodiments are merely illustrative and not restrictive, and that the embodiments are not restricted to the specific constructions and arrangements shown and described because modifications may occur to those ordinarily skilled in the art.

Reference throughout the specification to "one embodiment", "another embodiment", or "an embodiment" means that a particular feature, structure, or characteristic described in connection with the embodiment is included in at least one embodiment. Thus, the appearance of the phrases, such as "one embodiment" and "an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment. While the exemplary embodiments have been described herein, those skilled in the art will recognize that these exemplary embodiments can be practiced with modification and alteration as described herein. The description is thus to be regarded as illustrative rather than limiting.

Figure 2:
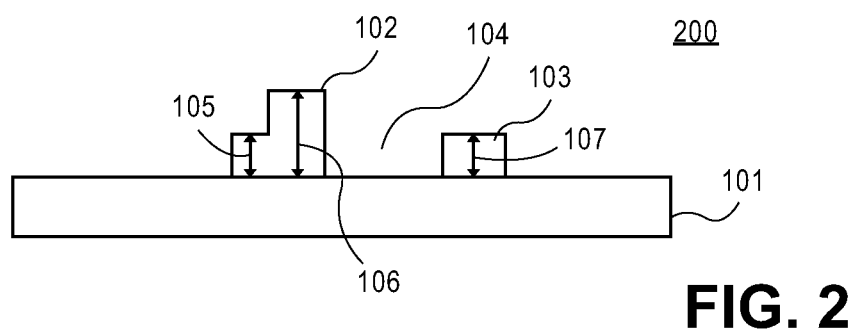
FIG. 2 is a side view showing the substrate according to one embodiment.

FIG. 1 is a perspective view 100 showing a substrate 101 according to one embodiment. FIG. 2 is a side view 200 showing substrate 101 according to one embodiment. In one embodiment, substrate 101 comprises organic, ceramic, glass, semiconductor, e.g., silicon, III-V, or any combination thereof materials. In one embodiment, substrate 101 is a part of a multi-chip package. In one embodiment, substrate 101 is a part of a System-in-Package (SiP). In another embodiment, substrate 101 comprises an interposer substrate. In one embodiment, the substrate 101 includes metallization interconnect layers for integrated circuits. In one embodiment, substrate 101 is a printed circuit board (PCB).

Generally, a printed circuit board (PCB) mechanically supports and electrically connects electronic components using conductive tracks, pads and other features etched from copper sheets laminated onto a non-conductive substrate. PCBs can be single sided (one copper layer), double sided (two copper layers) or multi-layer (outer and inner layers). Conductors on different layers of the PCB are connected with conductive vias.

The substrate 101 comprises one or more components, such as a component 102 and a component 103 deposited thereon. In one embodiment, the components are electronic components, e.g., transistors, memories, capacitors, inductors, resistors, optoelectronic devices, switches, and any other active and passive electronic components that are separated by an electrically insulating layer, for example, an interlayer dielectric, a trench insulation layer, or any other insulating layer known to one of ordinary skill in the art of the electronic device manufacturing. In one embodiment, at least one of the components is a mechanical structure. In at least some embodiments, the substrate 101 includes interconnects, for example, vias, configured to connect the metallization layers. In one embodiment, the active and passive components are embedded in the substrate 101.

Although a few examples of materials from which the substrate 101 may be formed are described here, any material that may serve as a foundation upon which passive and active electronic components (e.g., transistors, memories, capacitors, inductors, resistors, switches, integrated circuits, amplifiers, optoelectronic devices, or any other electronic devices) may be built falls within the spirit and scope of embodiments of the present invention.

Typically, a dead space 104 on substrate 101 refers to a space that is not utilized by the one or more components. As shown in FIGS. 1 and 2, components 102 and 103 are separated by a portion of dead space 104. As shown in FIGS. 1 and 2, component 102 has a portion having a height 105 and a portion having a height 107. Component 103 has a height 107.

Figure 3:
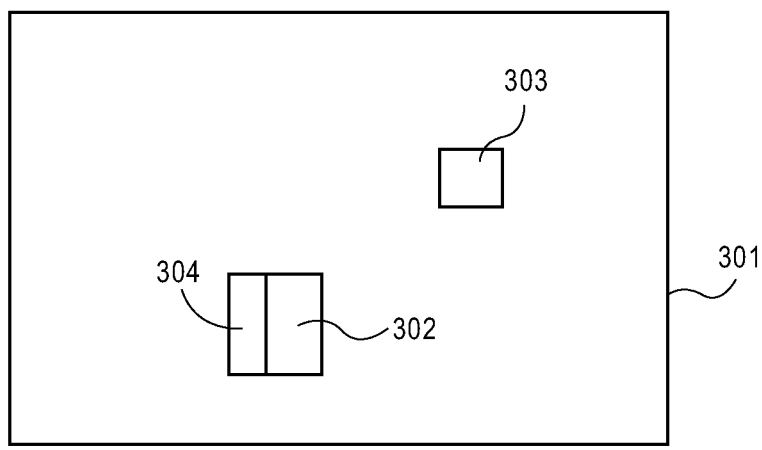
FIG. 3 is a view showing a topographic map of the components on the substrate according to one embodiment.

FIG. 3 is a view showing a topographic map 300 of the components on the substrate 101 according to one embodiment. Generally, the topography refers to an arrangement of the components on a substrate. Typically, the topographic map is a terrain map that represents relief using contour lines. A contour line is a line that connects points of equal elevation (height) above a given level. As shown in FIG. 3, a contour line 301 represents a top surface of substrate 101. A contour line 304 represents the height 105 of the component 102 and a contour line 302 represents the height 106 of component 102 relative to the top surface of the substrate 101. A contour line 303 represents height 107 of component 103 relative to the top surface of the substrate 101. Contour line 302 represents an elevation level higher than that of the elevation level represented by the contour lines 304 and 303. Contour line 301 represents an elevation level that is lower than that of the contour lines 302, 303, or 304.

In one embodiment, a three dimensional (3D) scan of the surface of the one or more components on the substrate is performed. In one embodiment, a 3D image of the one or more components on the substrate is generated using a 3D camera. In one embodiment, a terrain map of the one or more components on the substrate is computed using the 3D image. In one embodiment, the 3D scan image of the surface of the one or more components on the substrate is sliced up in a horizontal direction to generate a plurality of contour lines representing levels of the terrain map of the one or more components on the substrate. The plurality of contour lines are used to cut out layers of a template battery, as described in further detail below.

Figure 4:
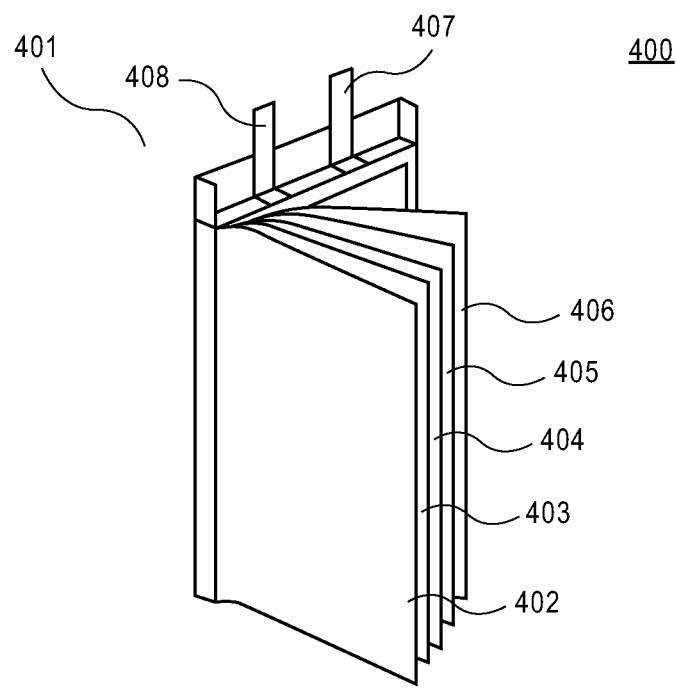
FIG. 4 is a view showing a thin sheet battery to provide layers for a template battery according to one embodiment.

FIG. 4 is a view 400 showing a thin sheet battery 401 to provide layers for a template battery according to one embodiment. A thin sheet battery 401 comprises a plurality of layers, e.g., a packing foil layer 402, a cathode layer 403, a separator layer 404, an anode layer 405, a separator layer 406, a positive terminal 407 and a negative terminal 408. Generally, the cathode is considered the electrically positive side of a battery. During discharge, current is supplied flowing from the cathode to the anode. During charging, current is forced into the anode in the reverse direction to charge the battery. In one embodiment, the layers of the thin sheet battery 401 are cut out based on the contour lines of the terrain map of the one or more components on the substrate to create a template battery, as described in further detail below.

In one embodiment, the anode layer 405 comprises carbon. The cathode layer 403 comprises a lithium metal oxide (e.g., a lithium cobalt oxide, lithium iron phosphate, lithium manganese oxide), or other lithium metal oxide. In one embodiment, the separator layer 404 comprises a polymer serving as both electrolyte and separator. In another embodiment separator layer 404 comprises a ceramic serving as both electrolyte and separator. The separator layer 404 prevents the electrodes 403 and 404 from touching each other directly, so that only ions and not the electrode particles, can migrate through the separator from one electrode to the other electrode. The separation layer may also prevent electrons from traveling through it. In another embodiment, the battery 401 comprises an electrolyte (not shown) that provides a conductive medium to move the ions. In another embodiment, the electrolyte comprises an organic solvent incorporating a salt such as $LiPF_6$. In another embodiment, the electrolyte is a solid polymer electrolyte. In yet another embodiment, the electrolyte is a ceramic material. In another embodiment, battery 401 is a lithium-ion battery, or any other battery e.g., zinc-polymer or lithium-metal. In another embodiment, the thin sheet battery is a pouch battery that comprises layers of a thin sheet of metal (e.g., aluminum or copper) coated by a material that absorbs lithium ions, and layers of plastic. In one non-limiting example, the thickness of each of the layers 402, 403, 404, 405 and 406 is from about 0.1 microns (μm) to about 10 μm. In more specific embodiment, the thickness of each of the layers 402, 403, 404, 405 and 406 is from about 10 μm to about 100 μm.

In one embodiment, one or more layers of the thin sheet battery 401 are cut out to compensate for the topography of the components on the substrate 101 to create a template battery. That is, the one or more layers of the template battery mirror the relief of the underlying components on the substrate. In one embodiment, the one or more layers of the template battery represent levels of a terrain map of the one or more components on the substrate. In one embodiment, the one or more layers of the template battery are thicker over low level elevation portions on the substrate and thinner over high level elevation portions on the substrate, as described in further detail below. In one embodiment, the edges of the template battery layers correspond to the contour lines of the terrain map, as described in further detail below.

Figure 5:
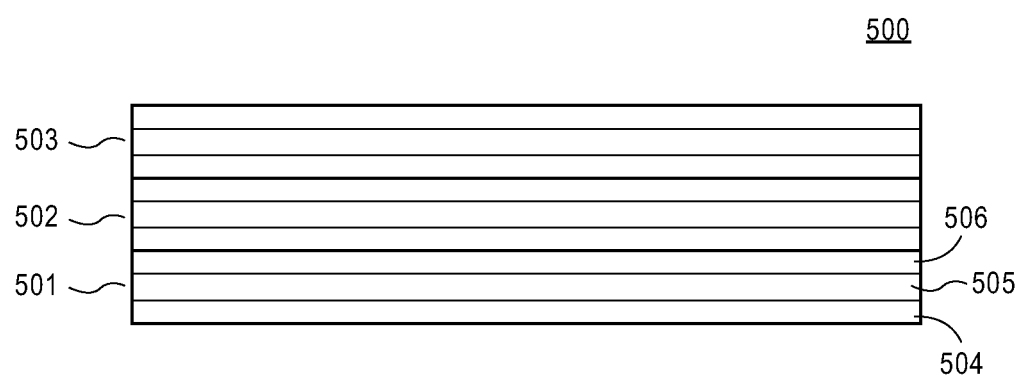
FIG. 5 is a view of a stack comprising a plurality of layers to provide a template battery according to one embodiment.

FIG. 5 is a view of a stack 500 comprising a plurality of layers to provide a template battery according to one embodiment. In one embodiment, a thin sheet battery, e.g., battery 401 is cut into a plurality of layers, such as a layer 501, a layer 502, and a layer 503. Each of the layers 501, 502 and 503 comprises two electrode layers and a separator layer between the two electrode layers. For example, layer 501 comprises an electrode layer 504, a separator layer 505, and an electrode layer 506. Insulating layers may be present between layers 501, 502, 503 serving the containment and/or insulating properties for which the packaging foil layer, 402 is shown in FIG. 4. In one embodiment, layers 501, 502 and 503 are a part of the thin sheet battery, e.g., battery 401. In one embodiment, electrode layer 504 represents cathode layer 403, separator layer 505 represents separator layer 404, an electrode layer 506 represents anode layer 405.

In one embodiment, each of the layers 501, 502 and 503 is a sheet battery, a capacitor layer, or other energy storage device layer. In one non-limiting example, the thickness of each of the layers 501, 502 and 503 is from about 1 μm to about 10 μm. In another non-limiting example, the thickness of each of the layers 501, 502 and 503 is from about 10 μm to about 100 μm In yet another non-limiting example, the thickness of each of the layers 501, 502 and 503 is from about 100 μm to about 1000 μm.

Figure 6:
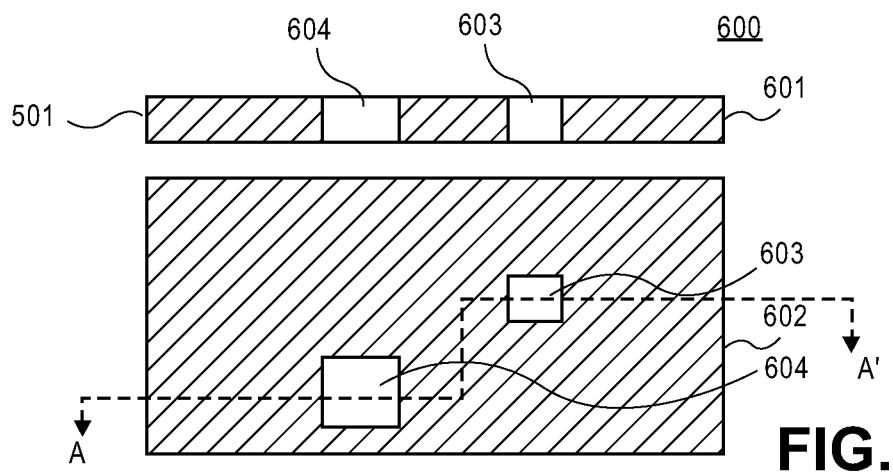
FIG. 6 is a view showing a cross-sectional view and a top view of a layer to provide a template battery according to one embodiment.

FIG. 6 is a view 600 comprising a cross-sectional view 601 and a top view 602 of the layer 501 to provide a template battery according to one embodiment. Cross-sectional view 601 is along a line A-A', as shown in FIG. 6. Layer 501 comprises an opening 603 to expose component 103 and an opening 604 to expose component 102. As shown in FIG. 6, the openings 603 and 604 correspond to contour lines 302, 303 and 304 of the terrain map 300.

Figure 7:
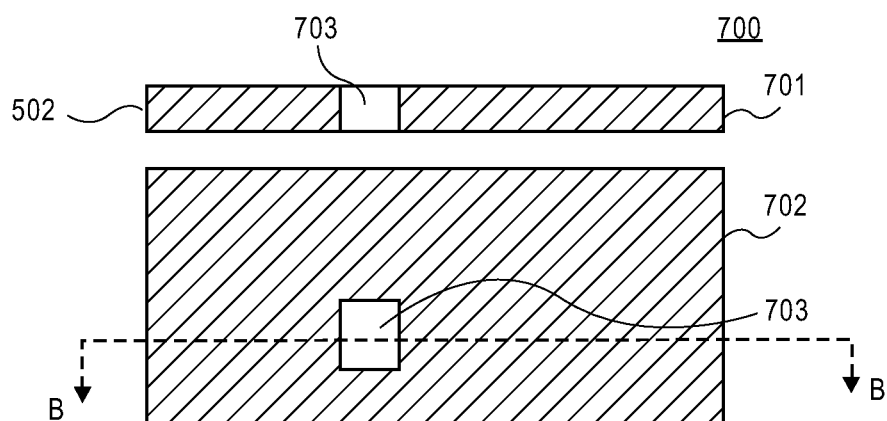
FIG. 7 is a view showing a cross-sectional view and a top view of a layer to provide a template battery according to one embodiment.

FIG. 7 is a view 700 comprising a cross-sectional view 701 and a top view 702 of the layer 502 to provide a template battery according to one embodiment. Cross-sectional view 701 is along a line B-B', as shown in FIG. 7. Layer 502 comprises an opening 703 to expose the portion of component 103 having height 106. As shown in FIG. 7, the opening 703 correspond to contour line 302 of the terrain map 300.

Figure 8:
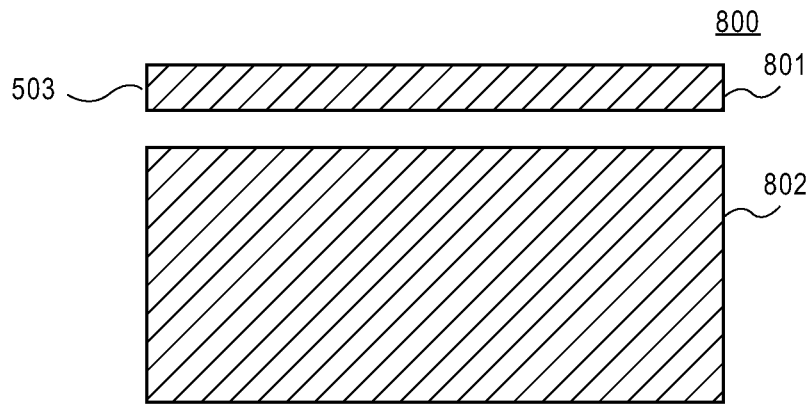
FIG. 8 is a view showing a side view and a top view of a layer to provide a template battery according to one embodiment.

FIG. 8 is a view 800 illustrating a side view 801 and a top view 802 of the layer 503 to provide a template battery according to one embodiment. Layer 503 is a continuous layer, as shown in FIG. 8. The edges of layer 503 correspond to contour line 301 of the terrain map 300. As shown in FIGS. 6, 7, and 8 each of the layers 501, 502, and 503 is cut according to a topography that mirrors the topography of the one or more components on the substrate 101. In one embodiment, each the layers 501, 502, and 503 is cut using one of the cutting techniques (e.g., laser cutting, or die-cutting, or other cutting technique known to one of ordinary skill in the art of electronic device manufacturing.

Figure 9:
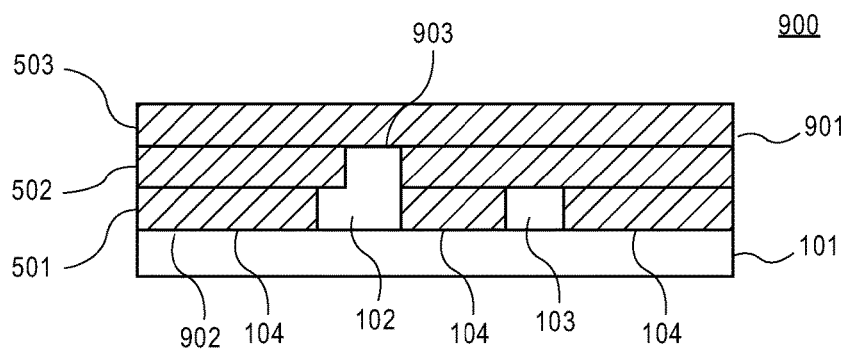
FIG. 9 is a cross-sectional view showing a template battery that fills in a dead space between components on a substrate according to one embodiment.
Figure 10:
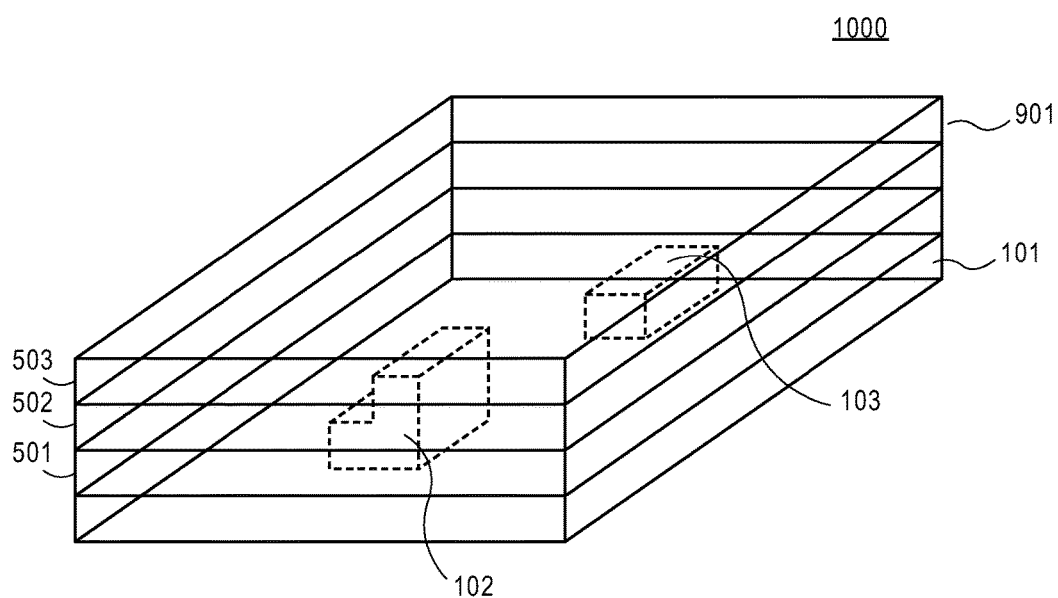
FIG. 10 is a perspective view of the template battery according to one embodiment.

FIG. 9 is a cross-sectional view 900 showing a template battery 901 that fills in dead space 104 unused by components 102 and 103 on substrate 101 according to one embodiment. FIG. 10 is a perspective view 1000 of the template battery 901 according to one embodiment. Cross-sectional view 900 is along a line C-C'. As shown in FIGS. 9 and 10, the template battery comprises layers 501, 502, and 503 stacked on top of one another.

As shown in FIGS. 9 and 10, a portion 902 of the substrate 101 is lower than a portion 903 of substrate 101. The template battery 900 is thicker over low portion 902 than over high portion 903. That is, the template battery 901 is build of the layers that fill in the gaps between the components on the substrate to increase the energy density without compromising the device performance and size. As shown in FIGS. 9 and 10, the layers 501, 502, and 503 are arranged to compensate for the topography of the one or more components on the substrate 101. That is, the template battery 901 has a topography that is a mirror image of the topography of the one or more components on the substrate.

Figure 11:
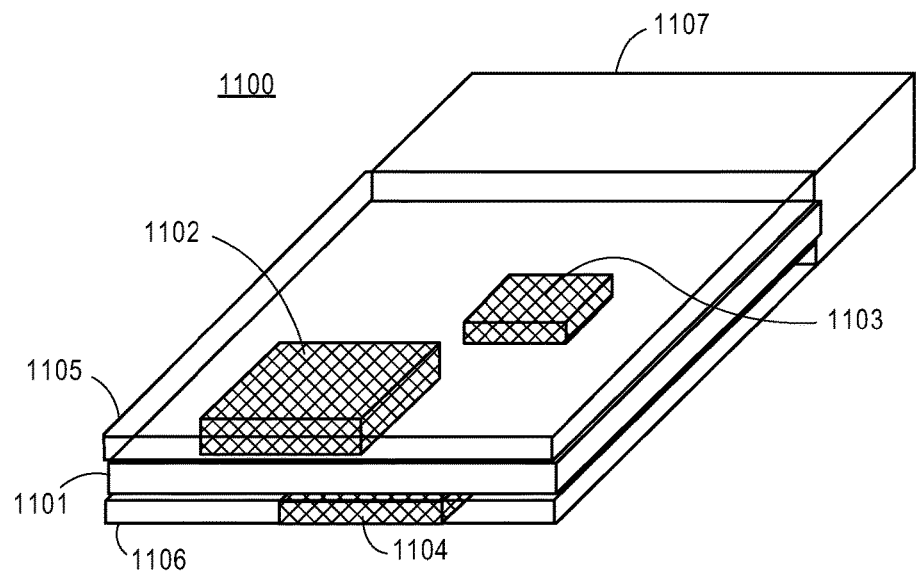
FIG. 11 is a perspective view of a system comprising template batteries and a main battery according to one embodiment.

In one embodiment, layers 501, 502, and 503 are coupled in parallel to sustain the same voltage and charge level for each layer. In this case, all negative electrode layers are connected to a negative terminal, and all positive electrode layers are connected to a positive terminal. In another embodiment, layers 501, 502 and 503 are connected in series. In this case, the negative electrode layer of one of the layers 501, 502 and 503 is connected to a positive electrode layer of another one of the layers 501, 502 and 503, and the positive electrode layer of one of the layers 501, 502 and 503 is connected to a negative electrode layer of another one of the layers 501, 502 and 503. In another embodiment, the layers of the template battery are matched so that a first randomly ordered set of layers connected in parallel connects in series to a second set of layers connected in parallel to create the same capacity as the first set of layers FIG. 11 is a perspective view 1100 of a system comprising template batteries and a main battery 1107 according to one embodiment. As shown in FIG. 11, a template battery 1105 comprises a layer that fills in a dead space not utilized by components 1102 and 1103 on a front side of a substrate 1101, as described above. A template battery 1106 comprises a layer that fills in a dead space not utilized by a component 1104 on a back side of the substrate 1101. In one embodiment, each of the template batteries 1105 and 1106 represents one of the template batteries described above. The template batteries 1105 and 1106 are connected to main battery 1107.

In one embodiment, at least one of the template batteries is connected to the main battery in series. In another embodiment, at least one of the template batteries is connected to the main battery in parallel. In one embodiment, at least one of the template batteries is used as a standalone main battery. In yet another embodiment, at least one of the template batteries is connected to the main battery via a charge controller as described in further detail below with respect to FIGS. 14 and 15. In one embodiment, at least one of the template batteries has a chemistry that is the same as that of the main battery. In another embodiment, the template battery has a chemistry that is different from that of the main battery. In one embodiment, at least one of the template batteries is a fast charge battery (e.g., a capacitor, a fast charge Li-ion battery, or any other fast charge battery). In one embodiment, at least one of the template batteries charges faster than the main battery.

In one embodiment, main battery 1107 is a lithium ion battery, e.g., a lithium metal oxide battery, a lithium iron phosphate battery, or any other battery e.g a zinc-polymer or lithium-metal battery. In one embodiment, main battery 1107 is a thin sheet battery, as described above. In one embodiment, the template battery comprises a thermally conductive material. In such a case, heat from the one or more components, (e.g., ICs and passive and active devices) is conducted away using the template battery that contributes to a system cooling. In one embodiment, the template battery comprises a chemistry that is different from that of a lithium-ion battery.

Figure 12:
FIG. 12 is a view showing an example of the terrain map that is computed based on a 3D scan image of the one or more components on the substrate according to one embodiment.

FIG. 12 is a view 1200 illustrating a terrain map 1201 that is computed based on a 3D scan image of the one or more components on the substrate according to one embodiment. The terrain map 1200 comprises contour lines, such as contour lines 1202 and 1203 that represent the relief of the substrate comprising one or more components, as described above. In one embodiment, the terrain map 1200 is used to build a template battery that fills in a dead space unused by the components on the substrate, as described above.

Figure 13:
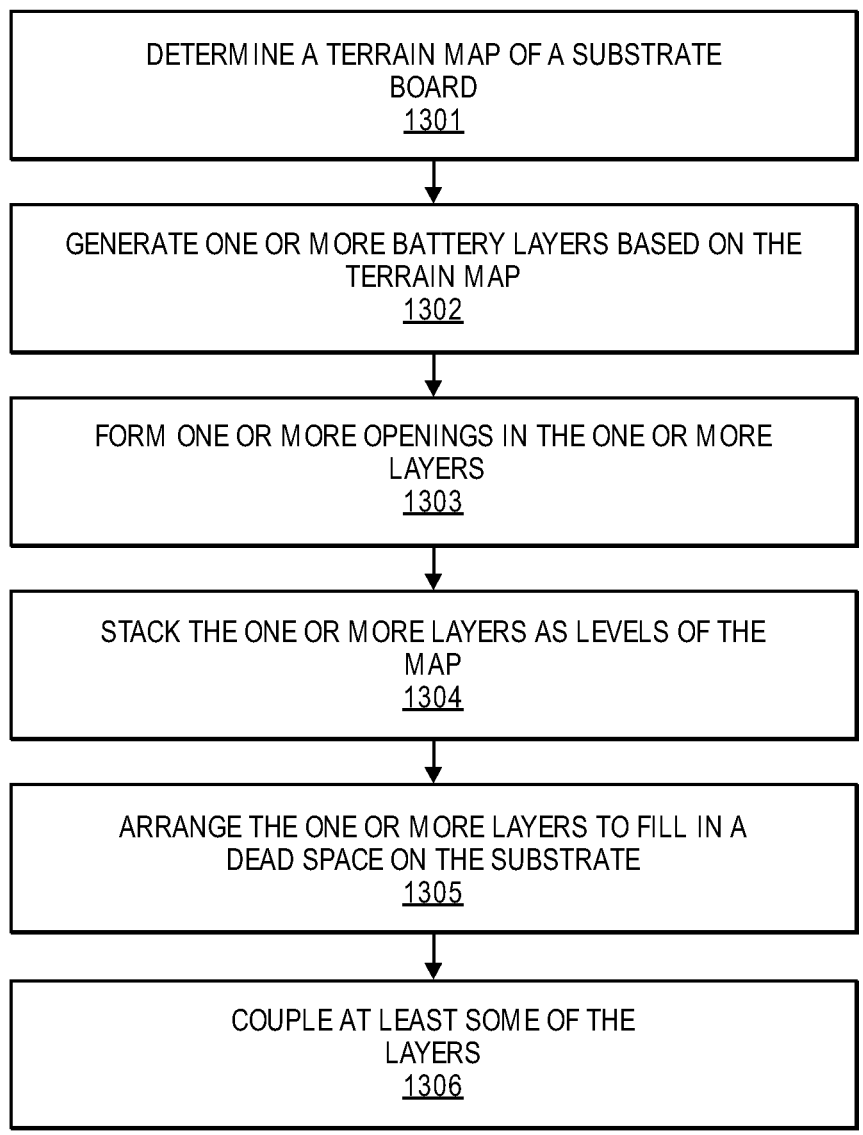
FIG. 13 is a flowchart of a method to provide a template battery according to one embodiment.

FIG. 13 is a flowchart of a method 1300 to provide a template battery according to one embodiment. At block 1301 a terrain map of a substrate comprising one or more components deposited thereon is determined, as described above. At block 1302 one or more layers for a template battery are generated based on the terrain map, as described above. In one embodiment, the one or more layers comprise a first electrode layer; a second electrode layer; and a separator layer coupled to the first electrode layer and the second electrode layer, as described above. In one embodiment, the one or more layers comprise an energy storage device layer, a battery layer, or both. At block 1303 one or more openings in the one or more layers are formed to expose the one or more components, as described above. In one embodiment, the sizes of the one or more openings are adjusted to the size of the one or more components at a corresponding elevation level relative to the substrate, as described above. At block 1304 the one or more layers are stacked on top one another as levels of the terrain map, as described above. At block 1305 the one or more layers are arranged to fill in a dead space unutilized by the one or more components on the substrate, as described above. In one embodiment, the one or more layers are arranged as a mirror image of the topography of the one or more components on the substrate, as described above. In one embodiment, the one or more layers are thicker over a first portion of the substrate than over a second portion of the substrate, wherein the first portion is thinner than the second portion, as described above. At block 1306 at least some of the layers are coupled to each other. In one embodiment, at least some of the layers are coupled in parallel, as described above. In another embodiment, at least some of the layers are coupled in series, as described above. In yet another embodiment, a first set of layers are coupled in parallel, and a second set of layers is coupled to the first set of layers in series, as described above.

Figure 14:
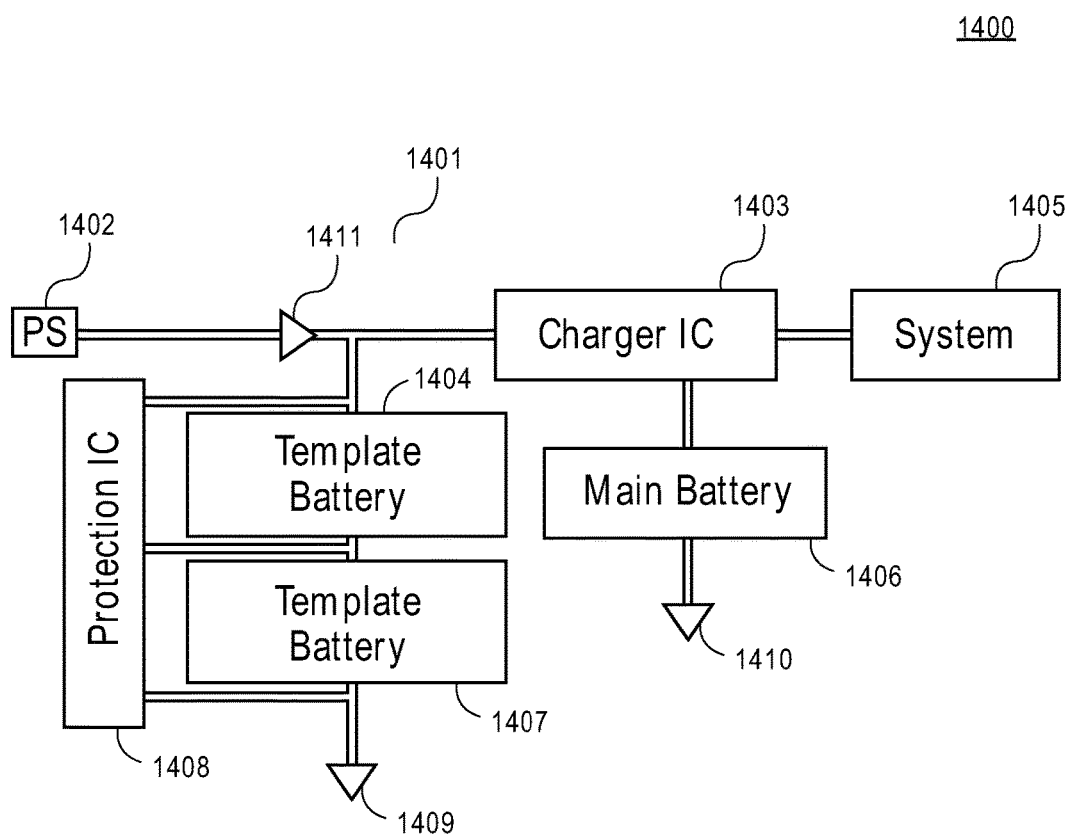
FIG. 14 is a view showing a block diagram of a circuit design of a system to provide a template battery according to another embodiment.

FIG. 14 is a view 1400 showing a block diagram of a circuit design of a system 1400 to provide a template battery according to another embodiment. The system 1400 comprises a template battery 1404, a template battery 1407, a main battery 1406, and a charge controller (charger IC) 1403 to provide an electric power to a system 1405. In one embodiment, each of the template batteries 1404 and 1407 represents one of the template batteries described above. Generally, the voltage of each of the template batteries and main battery depends on the battery chemistry. In one embodiment, at least one of the template batteries 1404 and 1407 is capable of a constant current charge. In one embodiment, at least one of the template batteries 1404 and 1407 is capable of a constant voltage charge. In one embodiment, at least one of the template batteries 1404 and 1407 has a charge voltage that is different from that of the main battery 1406. In one embodiment, at least one of the template batteries 1404 and 1407 charges faster than the main battery 1406. In one embodiment, at least one of the template batteries 1404 and 1407 has a self discharge/leakage current that is different from that of the main battery 1406. In more specific embodiment, at least one of the template batteries 1404 and 1407 has a self-discharge current that is higher than that of the main battery 1406.

In one embodiment, the voltage of each of the template batteries, or capacitors, is in an approximate range of about 0 Volts (discharged) to about 2.7V (fully charged). In another embodiment, the voltage of the template battery is in the approximate range of about 2.5 Volts (discharged) to about 4.4 V (charged), or multiples thereof, should several layers, or groups of layers, be connected in series to comprise the entire template battery. In one embodiment, main battery 1406 represents one of the main batteries described above. A power supply (PS) 1402 provides electric power 1411 to template batteries 1404 and 1407 and charger IC 1403. In one embodiment, power supply 1402 is an AC adapter, AC/DC adapter, AC/DC converter, or any other power supply. In one embodiment, power supply 1402 is a USB AC adapter. In one embodiment, power supply 1402 is a USB AC adapter that provides 5V DC power.

As shown in FIG. 14, charger IC 1403 is coupled between template battery 1404 and main battery 1406. Generally, the charger IC limits the rate at which electric current is added to or drawn from the batteries. The charger IC prevents overcharging and protects against overvoltage. The charge-C prevents the system 1405 from completely draining ("deep discharging") the battery. The charger IC performs controlled discharges to protect battery life. In one embodiment, system 1405 is a data processing system, e.g., a computer system, or any other system to receive the power using the batteries.

In one embodiments, system 1405 is a part of a portable device, e.g., a mobile phone, a tablet, a laptop, a wrist device, a player, or any other portable device. In another embodiment, system 1405 is a part of a desktop device. In one embodiment, a protection integrated circuit (IC) 1408 protects template batteries 1404 and 1407 from overcharge and over discharge. In one embodiment, the protection IC 1408 includes one or more temperature sensors, a voltage converter/regulator circuit, a voltage tap and a battery charge state monitor to control the state of charge and current in and out of each cell of the template battery, capacities of each individual cell and temperature of each cell.

As shown in FIG. 14, in at least some embodiments, template batteries 1404 and 1407 are between power supply 1402, charger IC 1403 and ground 1409. In at least some embodiments, main battery 1406 is between charger IC 1403 and a ground 1410. In at least some embodiments, for the system 1400, neither of the template batteries 1404 and 1407 requires a dedicated charger IC. Each of the template batteries 1404 and 1407 is charged directly from the power supply 1402, as shown in FIG. 14. For this circuit design, the template battery that has a voltage that is different from that of the main battery is acceptable. Even if the template battery has a voltage that is different from that of the main battery, such voltage is converted to an appropriate voltage for the main battery 1406 via charger IC 1403.

Additionally, even if one of the template batteries 1404 and 1407 has a self-discharge/leakage higher than that of the main battery 1403, such a self-discharge/leakage does not impact the main battery or the system 1405 as the template batteries 1404 and 1407 are separated from main battery 1406 via charger IC 1403. In this embodiment, when the power supply is plugged, the template battery has been charged faster than the main battery. After the power supply is unplugged, the template battery continues to charge the main battery if the main battery is not full. As fast-charged energy is transferred to the main battery from the template battery, users can enjoy fast charge even if the template battery has higher self-discharge than the main battery.

Figure 15:
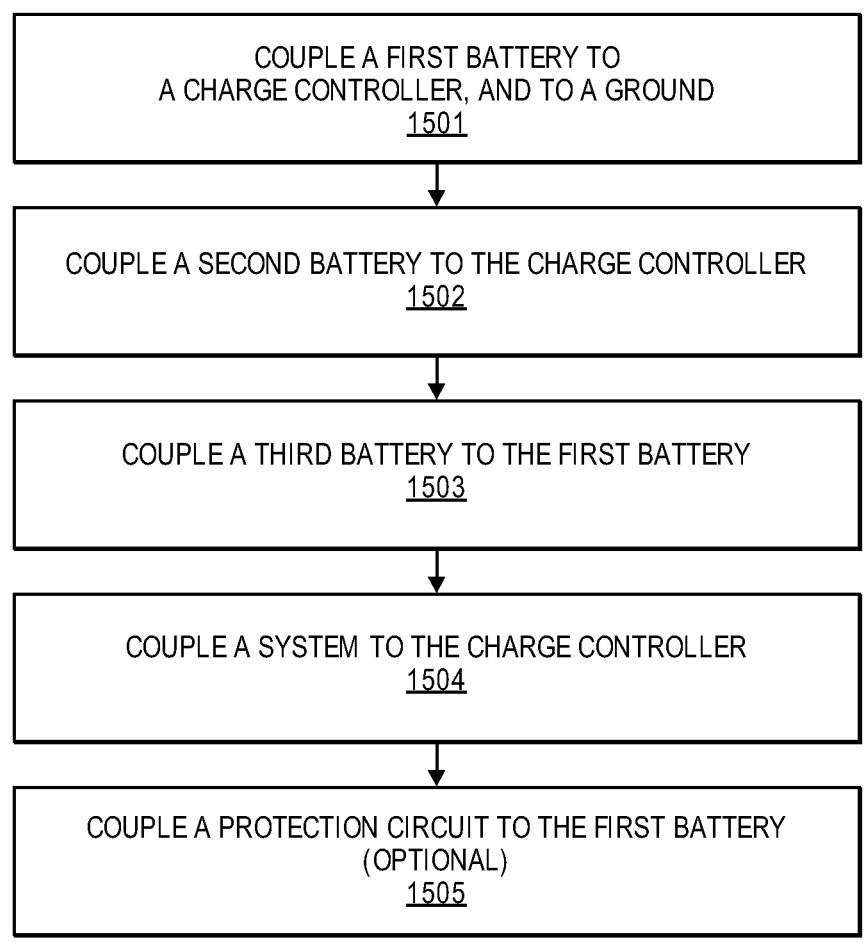
FIG. 15 is a flowchart of a method to provide a template battery according to one embodiment.

FIG. 15 is a flowchart of a method 1500 to provide a template battery according to one embodiment. At block 1501 a first battery is coupled to a charge controller and to a ground, as described above. In one embodiment, the first battery is coupled to a power supply, as described above. In one embodiment, the first battery is a template battery comprising one or more layers that fill in a dead space that is not used by the one or more components on a substrate, as described above. At block 1502 a second battery is coupled to the charge controller, as described above. In one embodiment, the second battery is a main battery, as described above. At block 1503 a third battery is coupled to the charge controller, as described above. In one embodiment, the third battery is a template battery, as described above. At block 1504 a system (e.g., system 1405) is coupled to the charge controller, as described above. In one embodiment, the system is a data processing system, as described above. In one embodiments, the system is a part of a portable device, e.g., a mobile phone, a tablet, a laptop, a wrist device, a player, or any other portable device. In another embodiment, the system is a part of a desktop device, as described above. At block 1505 a protection circuit is optionally coupled to the first battery, as described above.

Figure 16:
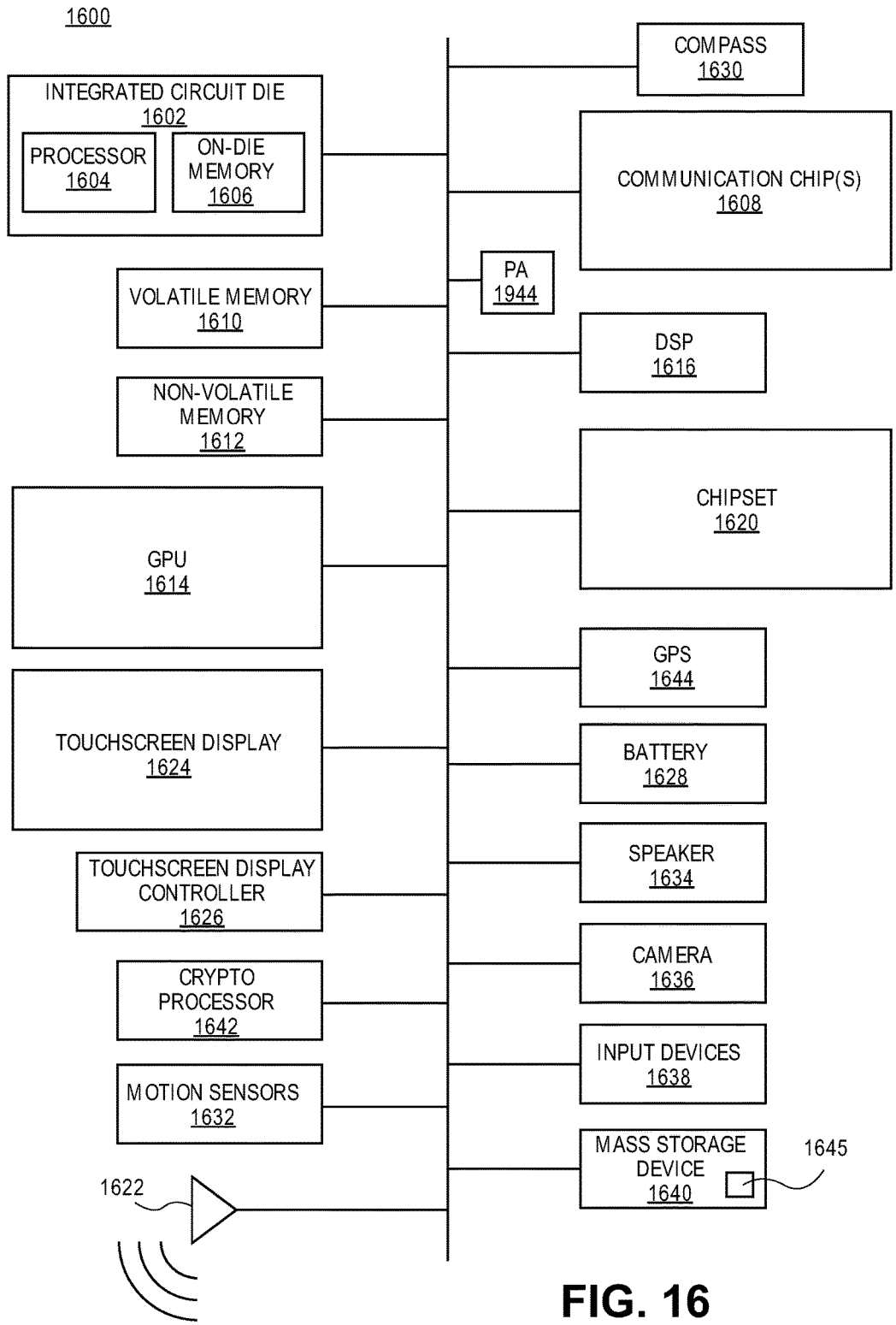
FIG. 16 illustrates a data processing system in accordance with one embodiment.

FIG. 16 illustrates a data processing system 1600 in accordance with one embodiment. Data processing system processing 1600 represents any data processing system to provide a template battery, as described herein with respect to FIGS. 1-15. In alternative embodiments, the data processing system 1600 may be connected (e.g., networked) to other machines in a Local Area Network (LAN), an intranet, an extranet, or the Internet. The data processing system 1600 may operate in the capacity of a server or a client machine in a client-server network environment, or as a peer machine in a peer-to-peer (or distributed) network environment.

In various embodiments, the data processing system 1600 may be a desktop computer, a laptop computer, a netbook computer, a notebook computer, an ultrabook computer, a smartphone, a tablet, a personal digital assistant (PDA), an ultra mobile PC, a mobile phone, a wrist device, a server, a printer, a scanner, a monitor, a set-top box, an entertainment control unit, a digital camera, a portable music player, a digital video recorder, a web appliance, a network router, a switch or bridge, or any machine capable of executing a set of instructions that specify actions to be taken by that data processing system. Further, while only a single data processing system is illustrated, the term "data processing system" shall also be taken to include any collection of data processing systems that individually or jointly execute a set (or multiple sets) of instructions to perform any one or more of the methodologies described herein. In further implementations, the data processing system 1600 may be any other electronic device that processes data.

A processor 1604 represents one or more general-purpose processing devices such as a microprocessor, central processing unit, or other processing device. More particularly, the processor 1604 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1604 may also be one or more special-purpose processing devices such as an application specific integrated circuit (ASIC), a field programmable gate array (FPGA), a digital signal processor (DSP), network processor, or the like. Processor 1604 is configured to control a processing logic for performing the operations described herein with respect to FIGS. 1-15.

The data processing system 1600 may include a number of components. In one embodiment, these components are attached to one or more motherboards. In an alternate embodiment, these components are fabricated onto a single system-on-a-chip (SoC) die rather than a motherboard. The components in the data processing system 1600 include, but are not limited to, an integrated circuit die 1602 and at least one communication chip 1608. In some implementations the communication chip 1608 is fabricated as part of the integrated circuit die 1602. The integrated circuit die 1602 may include processor 1604, an on-die memory 1606, often used as a cache memory, that can be provided by technologies such as embedded DRAM (eDRAM) or spin-transfer torque memory (STTM or STTM-RAM).

Data processing system 1600 may include other components that may or may not be physically and electrically coupled to the motherboard or fabricated within an SoC die. These other components include, but are not limited to, a volatile memory 1610 (e.g., DRAM), a non-volatile memory 1612 (e.g., ROM or flash memory), a graphics processing unit 1614 (GPU), a digital signal processor 1616, a crypto processor 1642 (a specialized processor that executes cryptographic algorithms within hardware), a chipset 1620, an antenna 1622, a display or a touchscreen display 1624, a touchscreen controller 1626, a battery 1628 or other power source, a power amplifier (PA), a global positioning system (GPS) device 1644, a compass 1630, one or more sensors 1632 (that may include a power sensor to measure the power consumed by a node, power consumed by the system, or both; a motion sensor, or other sensor), a speaker 1634, a camera 1636, user input devices 1638 (e.g., a keyboard, mouse, stylus and touchpad), and a mass storage device 1640 (e.g., a hard disk drive, compact disk (CD), digital versatile disk (DVD), and so forth). In one embodiment, battery 1628 comprises one or more template batteries, as described above. In one embodiment, battery 1628 comprises a main battery, as described above. In one embodiment, battery 1628 is configured using the circuit design, as described above.

The communications chip 1608 enables wireless communications for the transfer of data to and from the data processing system 1600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1608 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The data processing system 1600 may include a plurality of communication chips 1608. For instance, a first communication chip 1608 may be dedicated to shorter range wireless communications such as Wi-Fi and Bluetooth and a second communication chip 1608 may be dedicated to longer range wireless communications such as GPS, EDGE, GPRS, CDMA, WiMAX, LTE, Ev-DO, and others.

The term "processor" may refer to any device or portion of a device that processes electronic data from registers and/or memory to transform that electronic data into other electronic data that may be stored in registers and/or memory.

The mass storage device 1640 may include a machine-accessible storage medium (or more specifically a computer-readable storage medium) 1645 on which is stored one or more sets of instructions (e.g., a software) embodying any one or more of the methodologies or functions described herein. The software may also reside, completely or at least partially, within the memory 1610, memory 1612, memory 1606 and/or within the processor 1604 during execution thereof by the data processing system 1600, the on-die memory 1606 and the processor 1604 also constituting machine-readable storage media. The software may further be transmitted or received over a network via a network interface device.

While the machine-accessible storage medium 1644 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the embodiments of the present invention. The term "machine-readable storage medium" shall accordingly be taken to include, but not be limited to, solid-state memories, and optical and magnetic media.

The above description of illustrated implementations of the invention, including what is described in the Abstract, is not intended to be exhaustive or to limit the embodiments of the invention to the precise forms disclosed. While specific implementations of, and examples for, the embodiments of the invention are described herein for illustrative purposes, various equivalent modifications are possible within the scope of the embodiments of the invention, as those skilled in the relevant art will recognize.

These modifications may be made to the embodiments of the invention in light of the above detailed description. The terms used in the following claims should not be construed to limit the embodiments of the invention to the specific implementations disclosed in the specification and the claims. Rather, the scope of the embodiments of the invention is to be determined entirely by the following claims, which are to be construed in accordance with established doctrines of claim interpretation.

The following examples pertain to further embodiments:

In one embodiment, a battery comprises one or more layers to fill in a dead space on a substrate comprising one or more components, wherein the one or more layers are arranged as a mirror image of the topography of the one or more components on the substrate.

In one embodiment, a battery comprises one or more layers to fill in a dead space on a substrate comprising one or more components, wherein the one or more layers are arranged as a mirror image of the topography of the one or more components on the substrate, wherein the one or more layers represent levels of a terrain map of the one or more components on the substrate.

In one embodiment, a battery comprises one or more layers to fill in a dead space on a substrate comprising one or more components, wherein the one or more layers are arranged as a mirror image of the topography of the one or more components on the substrate, wherein the one or more layers comprise a first electrode layer; a second electrode layer; and a separator layer coupled to the first electrode layer and the second electrode layer.

In one embodiment, a battery comprises one or more layers to fill in a dead space on a substrate comprising one or more components, wherein the one or more layers are arranged as a mirror image of the topography of the one or more components on the substrate, wherein the one or more layers comprises one or more openings to expose the one or more components.

In one embodiment, a battery comprises one or more layers to fill in a dead space on a substrate comprising one or more components, wherein the one or more layers are arranged as a mirror image of the topography of the one or more components on the substrate, wherein at least some of the layers are coupled in parallel.

In one embodiment, a battery comprises one or more layers to fill in a dead space on a substrate comprising one or more components, wherein the one or more layers are arranged as a mirror image of the topography of the one or more components on the substrate, wherein at least some of the layers are coupled in series.

In one embodiment, a battery comprises one or more layers to fill in a dead space on a substrate comprising one or more components, wherein the one or more layers are arranged as a mirror image of the topography of the one or more components on the substrate, wherein the one or more layers comprise a first set of layers coupled in parallel, and a second set of layers coupled to the first set of layers in series.

In one embodiment, a battery comprises one or more layers to fill in a dead space on a substrate comprising one or more components, wherein the one or more layers are arranged as a mirror image of the topography of the one or more components on the substrate, wherein the one or more layers comprise an energy storage device layer, a battery layer, or both.

In one embodiment, a battery comprises one or more layers to fill in a dead space on a substrate comprising one or more components, wherein the one or more layers are arranged as a mirror image of the topography of the one or more components on the substrate, wherein the one or more layers are thicker over a first portion of the substrate than over a second portion of the substrate, and wherein the first portion is lower than the second portion.

In one embodiment, a system to provide a battery comprises a first battery; a charge controller coupled to the first battery; and a second battery coupled to the charge controller.

In one embodiment, a system to provide a battery comprises a first battery; a charge controller coupled to the first battery; and a second battery coupled to the charge controller, wherein the first battery is coupled to a ground.

In one embodiment, a system to provide a battery comprises a first battery; a charge controller coupled to the first battery; and a second battery coupled to the charge controller, wherein the first battery is coupled to a power supply.

In one embodiment, a system to provide a battery comprises a first battery; a charge controller coupled to the first battery; a second battery coupled to the charge controller, and a processing system coupled to the charge controller.

In one embodiment, a system to provide a battery comprises a first battery; a charge controller coupled to the first battery; and a second battery coupled to the charge controller; and a third battery coupled to the first battery.

In one embodiment, a system to provide a battery comprises a first battery; a charge controller coupled to the first battery; and a second battery coupled to the charge controller, and a protection circuit coupled to the first battery.

In one embodiment, a system to provide a battery comprises a first battery; a charge controller coupled to the first battery; and a second battery coupled to the charge controller, wherein the second battery is coupled to a ground.

In one embodiment, a system to provide a battery comprises a first battery; a charge controller coupled to the first battery; and a second battery coupled to the charge controller, wherein the first battery comprises one or more layers that fill in a dead space on a substrate comprising one or more components.

In one embodiment, a method to provide a battery comprises generating one or more layers to fill in a dead space on a substrate comprising one or more components; and arranging the one or more layers, wherein the one or more layers are arranged as a mirror image of the topography of the one or more components on the substrate.

In one embodiment, a method to provide a battery comprises determining a terrain map for one or more components on a substrate; generating one or more layers to fill in a dead space unused by the one or more components on the substrate; stacking the one or more battery layers as levels of the terrain map; and arranging the one or more layers, wherein the one or more layers are arranged as a mirror image of the topography of the one or more components on the substrate.

In one embodiment, a method to provide a battery comprises generating one or more layers to fill in a dead space on a substrate comprising one or more components; and arranging the one or more layers, wherein the one or more layers are arranged as a mirror image of the topography of the one or more components on the substrate, wherein the one or more layers comprise a first electrode layer; a second electrode layer; and a separator layer coupled to the first electrode layer and the second electrode layer.

In one embodiment, a method to provide a battery comprises generating one or more layers to fill in a dead space on a substrate comprising one or more components; forming one or more openings in the one or more layers to expose the one or more components; and arranging the one or more layers, wherein the one or more layers are arranged as a mirror image of the topography of the one or more components on the substrate.

In one embodiment, a method to provide a battery comprises generating one or more layers to fill in a dead space on a substrate comprising one or more components; and arranging the one or more layers, wherein the one or more layers are arranged as a mirror image of the topography of the one or more components on the substrate; and coupling at least some of the one or more battery layers in parallel.

In one embodiment, a method to provide a battery comprises generating one or more layers to fill in a dead space on a substrate comprising one or more components; arranging the one or more layers, wherein the one or more layers are arranged as a mirror image of the topography of the one or more components on the substrate, and coupling at least some of the one or more battery layers in series.

In one embodiment, a method to provide a battery comprises generating one or more layers to fill in a dead space on a substrate comprising one or more components; arranging the one or more layers, wherein the one or more layers are arranged as a mirror image of the topography of the one or more components on the substrate, coupling a first set of layers in parallel, and coupling a second set of layers to the first set of layers in series.

In one embodiment, a method to provide a battery comprises generating one or more layers to fill in a dead space on a substrate comprising one or more components; and arranging the one or more layers, wherein the one or more layers are arranged as a mirror image of the topography of the one or more components on the substrate, wherein the one or more layers comprise an energy storage device layer, a battery layer, or both.

In one embodiment, a method to provide a battery comprises generating one or more layers to fill in a dead space on a substrate comprising one or more components; and arranging the one or more layers, wherein the one or more layers are arranged as a mirror image of the topography of the one or more components on the substrate, wherein the one or more layers are thicker over a first portion of the substrate than over a second portion of the substrate, and wherein the first portion is lower than the second portion.

In one embodiment, a method to provide a battery comprises coupling a first battery to a charge controller, wherein the first battery is coupled to a ground; and coupling a second battery to the charge controller.

In one embodiment, a method to provide a battery comprises coupling a first battery to a charge controller, wherein the first battery is coupled to a ground; coupling a second battery to the charge controller; and coupling the first battery to a power supply.

In one embodiment, a method to provide a battery comprises coupling a first battery to a charge controller, wherein the first battery is coupled to a ground; and coupling a second battery to the charge controller, wherein the first battery comprises one or more layers that fill in a dead space on a substrate comprising one or more components.

In one embodiment, a method to provide a battery comprises coupling a first battery to a charge controller, wherein the first battery is coupled to a ground; coupling a second battery to the charge controller; and coupling a processing system to the charge controller.

In one embodiment, a method to provide a battery comprises coupling a first battery to a charge controller, wherein the first battery is coupled to a ground; coupling a second battery to the charge controller; and coupling a third battery to the first battery.

In one embodiment, a method to provide a battery comprises coupling a first battery to a charge controller, wherein the first battery is coupled to a ground; coupling a second battery to the charge controller, and coupling a protection circuit to the first battery.

In one embodiment, a method to provide a battery comprises coupling a first battery to a charge controller, wherein the first battery is coupled to a ground; and coupling a second battery to the charge controller, wherein the first battery is coupled to a power supply.

In one embodiment, a non-transitory machine readable medium comprises instructions that cause a data processing system to perform operations comprising generating one or more layers to fill in a dead space on a substrate comprising one or more components; and arranging the one or more layers, wherein the one or more layers are arranged as a mirror image of the topography of the one or more components on the substrate.

In one embodiment, a non-transitory machine readable medium comprises instructions that cause a data processing system to perform operations comprising determining a terrain map for one or more components on a substrate; generating one or more layers to fill in a dead space unused by the one or more components on a substrate; stacking the one or more layers as levels of the terrain map; and arranging the one or more layers, wherein the one or more layers are arranged as a mirror image of the topography of the one or more components on the substrate.

In one embodiment, a non-transitory machine readable medium comprises instructions that cause a data processing system to perform operations comprising generating one or more layers to fill in a dead space on a substrate comprising one or more components; forming one or more openings in the one or more battery layers to expose the one or more components; and arranging the one or more layers, wherein the one or more layers are arranged as a mirror image of the topography of the one or more components on the substrate.

In one embodiment, a non-transitory machine readable medium comprises instructions that cause a data processing system to perform operations comprising generating one or more layers to fill in a dead space on a substrate comprising one or more components; and arranging the one or more layers, wherein the one or more layers are arranged as a mirror image of the topography of the one or more components on the substrate; and coupling at least some of the one or more battery layers.

In one embodiment, a non-transitory machine readable medium comprises instructions that cause a data processing system to perform operations comprising coupling a first battery to a charge controller, wherein the first battery is coupled to a ground; and coupling a second battery to the charge controller.

In one embodiment, a non-transitory machine readable medium comprises instructions that cause a data processing system to perform operations comprising coupling a first battery to a charge controller, wherein the first battery is coupled to a ground; coupling a second battery to the charge controller; and coupling the first battery to a power supply.

In one embodiment, a non-transitory machine readable medium comprises instructions that cause a data processing system to perform operations comprising coupling a first battery to a charge controller, wherein the first battery is coupled to a ground; coupling a second battery to the charge controller; and coupling a processing system to the charge controller.

In one embodiment, a non-transitory machine readable medium comprises instructions that cause a data processing system to perform operations comprising coupling a first battery to a charge controller, wherein the first battery is coupled to a ground; coupling a second battery to the charge controller; and coupling a third battery to the first battery.

In one embodiment, a non-transitory machine readable medium comprises instructions that cause a data processing system to perform operations comprising coupling a first battery to a charge controller, wherein the first battery is coupled to a ground; coupling a second battery to the charge controller; and coupling a protection circuit to the first battery.

What is claimed is:

1. A battery comprising:
   a plurality of layers, wherein at least a subset of the plurality of layers comprise openings to form a first topography of the battery, the openings correspond to geometries of one or more components mounted on a substrate of a computing device, the one or more components mounted on the substrate form a second topography,
   wherein the first topography comprises a compliment of the second topography such that the openings of the plurality of layers, when the plurality of layers are overlaid on the substrate, are to be at least partially filled by the one or more components on the substrate.

2. The battery of claim 1, wherein the plurality of layers represent respective levels of a terrain map of the one or more components on the substrate.

3. The battery of claim 1, wherein the plurality of layers comprise:
   a first electrode layer;
   a second electrode layer; and
   a separator layer coupled to the first electrode layer and the second electrode layer.

4. The battery of claim 1, wherein at least some of the openings of the plurality of layers expose the one or more components.

5. The battery of claim 1, wherein at least some of the layers are coupled in parallel.

6. The battery of claim 1, wherein the plurality of layers comprise an energy storage device layer, a battery layer, or both.

7. The battery of claim 1, wherein the plurality of layers are thicker over a first portion of the substrate than over a second portion of the substrate, and wherein the first portion is lower than the second portion.

8. A system comprising:
   a substrate;
   one or more components mounted on the substrate;
   a first battery;
   a charge controller coupled to the first battery; and
   a second battery coupled to the charge controller, wherein the first battery comprises a plurality of layers, at least a subset of the plurality of layers comprise openings, the openings correspond to geometries of the one or more components mounted on a substrate of a computing device, the one or more components mounted on the substrate form a second topography, and the openings are to be at least partially filled by the one or more components when the plurality of layers are overlaid on the substrate.

9. The system of claim 8, wherein the first battery is coupled to a ground.

10. The system of claim 8, wherein first battery is coupled to a power supply.

11. The system of claim 8, further comprising a processing system coupled to the charge controller.

12. The system of claim 8, further comprising a third battery coupled to the first battery.

13. The system of claim 8, further comprising a protection circuit coupled to the first battery.

14. A method to provide a battery, comprising:
generating a plurality of layers of the battery, wherein at least a subset of the plurality of layers comprise openings to form a first topography of the battery, the openings correspond to geometries of one or more components mounted on a substrate of a computing device, the one or more components mounted on the substrate form a second topography; and
arranging the plurality of layers on the substrate, wherein the first topography comprises a compliment of the second topography such that the openings of the plurality of layers, and the plurality of layers are arranged on the substrate to at least partially fill each of the openings with the one or more components on the substrate.

15. The method of claim 14, further comprising
determining the second topography from a terrain map for the one or more components on the substrate; and
wherein arranging the plurality of layers on the substrate comprises stacking the plurality of layers as levels of the terrain map.

16. The method of claim 14, wherein the plurality of layers comprise:
a first electrode layer;
a second electrode layer; and
a separator layer coupled to the first electrode layer and the second electrode layer.

17. The method of claim 14, further comprising forming the openings in the plurality of layers, wherein at least some of the openings are to expose at least one of the one or more components.

18. The method of claim 14, further comprising coupling at least some of the plurality of layers in parallel.

19. The method of claim 14,
wherein the plurality of layers are thicker over a first portion of the substrate than over a second portion of the substrate, and
wherein the first portion is lower than the second portion.

* * * * *